United States Patent [19]

Nakajima

[11] Patent Number: 5,412,435
[45] Date of Patent: May 2, 1995

[54] INTERLACED VIDEO SIGNAL MOTION COMPENSATION PREDICTION SYSTEM

[75] Inventor: Yasuyuki Nakajima, Tokyo, Japan

[73] Assignee: Kokusai Denshin Denwa Kabushiki Kaisha, Tokyo, Japan

[21] Appl. No.: 84,708

[22] Filed: Jun. 25, 1993

[30] Foreign Application Priority Data

Jul. 3, 1992 [JP] Japan ............................. 4-199020
Nov. 27, 1992 [JP] Japan ............................. 4-339520

[51] Int. Cl.⁶ ...................... H04N 7/133; H04N 7/137
[52] U.S. Cl. ................................ 348/699; 348/416; 348/402; 348/413
[58] Field of Search ............... 348/699, 402, 407, 409, 348/413, 416, 700; H04N 7/137, 7/133

[56] References Cited

U.S. PATENT DOCUMENTS 4,777,530 10/1988 Kondo .............................. 348/416
4,864,394 9/1989 Gillard ............................. 348/416
5,072,293 12/1991 De Haan et al. ................. 348/699
5,083,202 1/1992 Parke ................................. 348/699
5,093,720 3/1992 Krause et al. .................... 348/416
5,136,376 8/1992 Yagasaki et al. ................. 348/409
5,175,618 12/1992 Ueda et al. ....................... 348/416
5,235,419 8/1993 Krause ............................. 348/416

Primary Examiner—Tommy P. Chin
Assistant Examiner—Vu Le
Attorney, Agent, or Firm—Pollock, VandeSande and Priddy

[57] ABSTRACT

A coder with a motion estimation system, which comprises a same parity field motion estimator, a near field motion estimator, an inter-field interpolated motion estimator, a comparator for selecting the smallest one of prediction errors E1 to E3 output from the respective motion estimators, and a selector for selectively outputting a motion vector from the motion estimator providing the smallest prediction error.

19 Claims, 14 Drawing Sheets

INTEGER PEL ACCURACY

FRACTIONAL PEL ACCURACY

INTEGER PEL ACCURACY

FRACTIONAL PEL ACCURACY

INTEGER PEL ACCURACY

FRACTIONAL PEL ACCURACY

INTEGER PEL ACCURACY

FRACTIONAL PEL ACCURACY

INTEGER PEL ACCURACY

FRACTIONAL PEL ACCURACY

INTEGER PEL ACCURACY

FRACTIONAL PEL ACCURACY

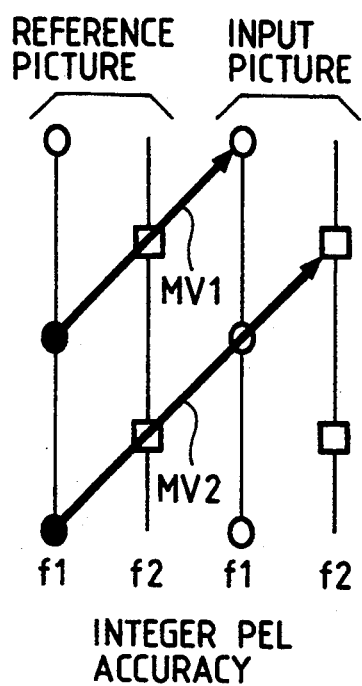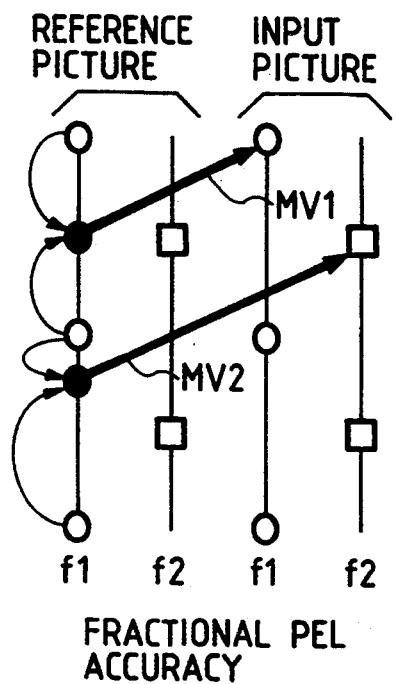
FIG. 19A
FIG. 19B
INTEGER PEL ACCURACY
FRACTIONAL PEL ACCURACY

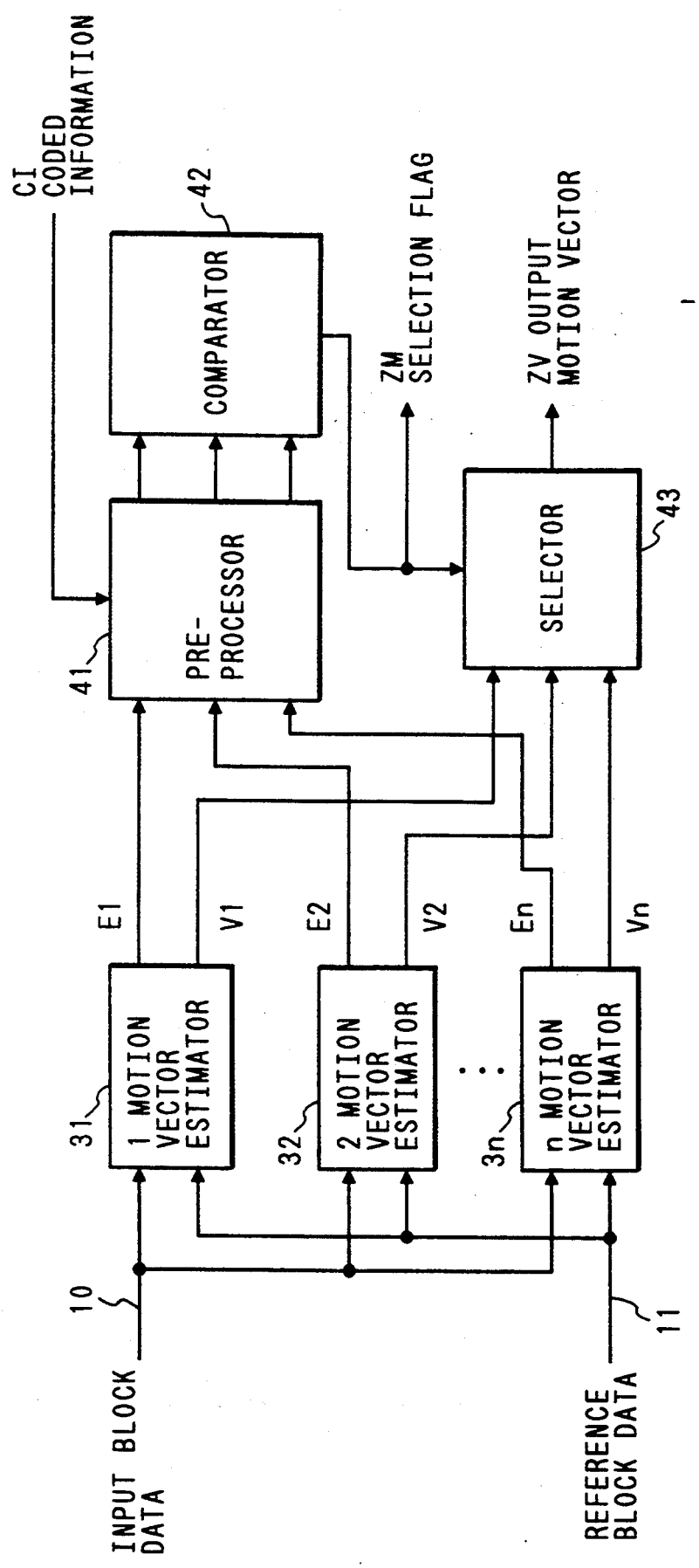

INTERLACED VIDEO SIGNAL MOTION COMPENSATION PREDICTION SYSTEM

BACKGROUND OF THE INVENTION

1. Field of the Invention

This invention relates to motion compensation prediction systems for coding of interlaced video signals and, more particularly, to interlaced video signal motion compensation prediction systems, which are intended to improve the coding efficiency in block-by-block motion compensation prediction in interlaced video signal transmission or storage systems, and also to those for improving coding efficiency reduction due to incorporation of unnecessary motion vectors.

2. Description of the Prior Art

In high efficiency video signal encoding systems for the purposes of television conference video signal communication and storage of video signal in CD-ROMs, each picture frame or field is divided into blocks each of, for instance, 16 pels by 16 lines, and high efficiency coding is attained by using intra-picture coding or inter-picture coding of the difference between a reference and a pertinent present picture due to motion compensation.

FIG. 1 shows a usual encoder. Referring to the Figure, designated at 71 is a subtracter which derives the difference between an input and a predicted picture X1 and X2 to generate a prediction error picture X3. Designated at 72 is a coder, such as a discrete cosine transform (DCT) circuit or a vector quantizer, at 73 a quantizer, at 74 an inverse quantizer, and at 75 a decoder such as an inverse discrete cosine transform (IDCT) circuit or an inverse vector quantizer. Designated at 76 is an adder which adds a prediction error picture X5 restored in the decoder 75 and the predicted picture X2 to generate a local decoded picture X6. The local decoded picture X6 is used as the reference picture. As the reference picture, it is possible to use, in lieu of the local decoded picture X6, an original picture without being coded, i.e., a picture preceding or succeeding the input picture X1.

The local decoded and input pictures X6 and X1 are stored in a frame memory 77. A motion estimator 78 does block-by-block motion estimation. More specifically, it does motion estimation by receiving pertinent input block data 10 and reference block data 11 in a motion search region from the frame memory 77 and, after the motion estimation, outputs a motion vector ZV and a selection flag ZM. Using the motion vector ZV and selection flag ZM obtained from the motion estimator 78, a motion compensator 79 outputs the predicted picture X2 produced from the reference block data 11.

The output of the quantizer 73 is coded in a variable length code coder 80, and a multiplexer 81 multiplexes the output of the variable length code doder 80 with the motion vector ZV and selection flag ZM obtained from the motion estimator 78 to produce a coder information output.

FIG. 2 shows a prior art example of motion estimator 78. A frame motion estimator 84 estimates motion in a frame block and outputs a prediction error signal ER and a motion vector VR. A field motion estimator 85, on the other hand, estimates motion in a field block and outputs a prediction error signal EF and a motion vector VF. The prediction error signals ER and EF are compared in a comparator 87. The comparator 87 outputs, to a selector 86, a selection flag ZM for selecting the smaller one of the prediction error signals ER and EF. In response to this flag, the selector 86 selects the motion estimator providing the smaller one of the two prediction error signals and outputs the motion vector ZV from the selected motion estimator. As shown, in the prior art the prediction error signals are obtained from the frame and field motion estimators, and the motion vector from the motion estimator providing the smaller one of the prediction error signals is used for motion compensation, thus providing for improved coding efficiency.

In the above coder employing the motion estimator 78, in which motion estimation is done with respect to both the frame and field of a picture to select the motion estimator providing the smaller prediction error for the motion compensation, has the following problems.

(1) When an accelerated motion is presented in video, the reference picture for an even field of the input picture is different from that for the odd field since motion vectors for those fields are different. In this case, therefore, if the frame motion estimator 84 is selected, the prediction error in the motion compensation is increased to reduce the coding efficiency.

(2) With constant speed motion in video, the extent of motion in each field is substantially the same. This means that when the field motion estimator 85 is selected, information about the quantity of motion vectors is doubled compared to the case of the frame motion compensation and the coding efficiency reduces.

FIG. 3 shows a different prior art example of the motion estimator 78. The input block data 10 which is part of the frame or field of a picture and the reference block data 11 are coupled to 1, 2 ..., n vector motion estimators 91, 92, ... 9n to derive respective prediction error signals E1, E2 ... En which are output to a comparator 101. The comparator 101 compares the prediction error signals E1 to En and outputs the selection flag ZM of the motion estimator providing the smallest prediction error signal to a selector 102. According to this selection signal ZM the selector 102 selectively outputs the motion vector ZV output from the motion estimator providing the smallest prediction error signal. In the case of n (n=2, 3 ...) vector motion estimations, n times the number of motion vectors are necessary compared to the case of 1 vector motion estimation.

In the prior art coder, the selected motion vector ZV is used for the motion compensation to provide for improved coding efficiency.

However, such a prior art coder has the following problem.

When the prediction error provided from each of the 1 to n vector motion estimators is not so large so that the prediction efficiency difference is small with the prediction error from any vector motion estimator while the prediction error provided from the n vector motion estimator is smallest, the n vector motion compensation is selected. Consequently, an increased number of motion vectors are sent out to reduce the coding efficiency.

SUMMARY OF THE INVENTION

An object of the invention is to provide an interlaced video signal motion compensation prediction system which can preclude the drawbacks noted above in the prior art and permits improvement of the coding efficiency and picture quality.

Another object of the invention is to provide an interlaced video signal motion compensation prediction system which can improve the coding efficiency reduction due to unnecessarily increased number of motion vectors.

A feature of the invention resides in a system which comprises means for storing an input and a reference picture for each disassembled field block thereof, same parity field motion estimation means for performing motion estimation for each field block between same parity field blocks of input and reference pictures by using same motion vectors for each field, thus obtaining motion vectors and obtaining the sum of field prediction errors from the motion estimation, near field motion estimation means for performing motion estimation for each field block with respect to the temporally nearest field block reference picture to input picture by using the same motion vectors for each field, thus obtaining motion vectors and obtaining the sum of field prediction errors from the motion estimation, and inter-field interpolated motion estimation means for performing motion estimation for each field block between a picture obtained by combining two field pictures of a reference picture and input picture by using the same motion vectors for each field, thus obtaining motion vectors and obtaining the sum of field prediction errors from the motion estimation.

According to the invention, when doing motion estimation of an input picture for each field block with respect to a reference picture, motion estimation is done between same parity fields, motion estimation is done with respect to the temporally nearest field reference field to the input picture, and further motion estimation is done with respect to a resultant field obtained from two reference fields. Then, the three prediction error signals obtained after the motion estimations are compared with one another, and a form of motion compensation of the smallest error is decided according to the result of comparison. Then, the motion vector corresponding to the decided motion compensation form is selected to output a selection flag and motion vector.

Another feature of the invention resides in a system which comprises a plurality of motion estimation means for performing motion estimation of each block with respect to one or more reference pictures by using motion vectors, processing means for providing a handicap value to a prediction error signal obtained from each motion estimation means, and means for comparing each prediction error output from the processing means and selecting a selection flag indicative of the smallest prediction error and a motion vector from the motion estimation means providing the smallest prediction error.

According to the invention, for block-by-block motion compensation prediction one or more motion vectors are used for each block, and for selecting a motion compensation system by using prediction error a handicap is provided in correspondence to the number of vectors used, and the motion compensation system is determined by preferentially selecting motion compensation with the smallest number of vectors used.

BRIEF DESCRIPTION OF THE DRAWINGS

FIG. 19A and FIG. 19B are views for explaining the operational principles underlying a far field motion estimator;

FIG. 20 is a block diagram showing a motion estimator in a fourth embodiment of the invention.

DETAILED DESCRIPTION OF THE PREFERRED EMBODIMENTS

Figure 4:
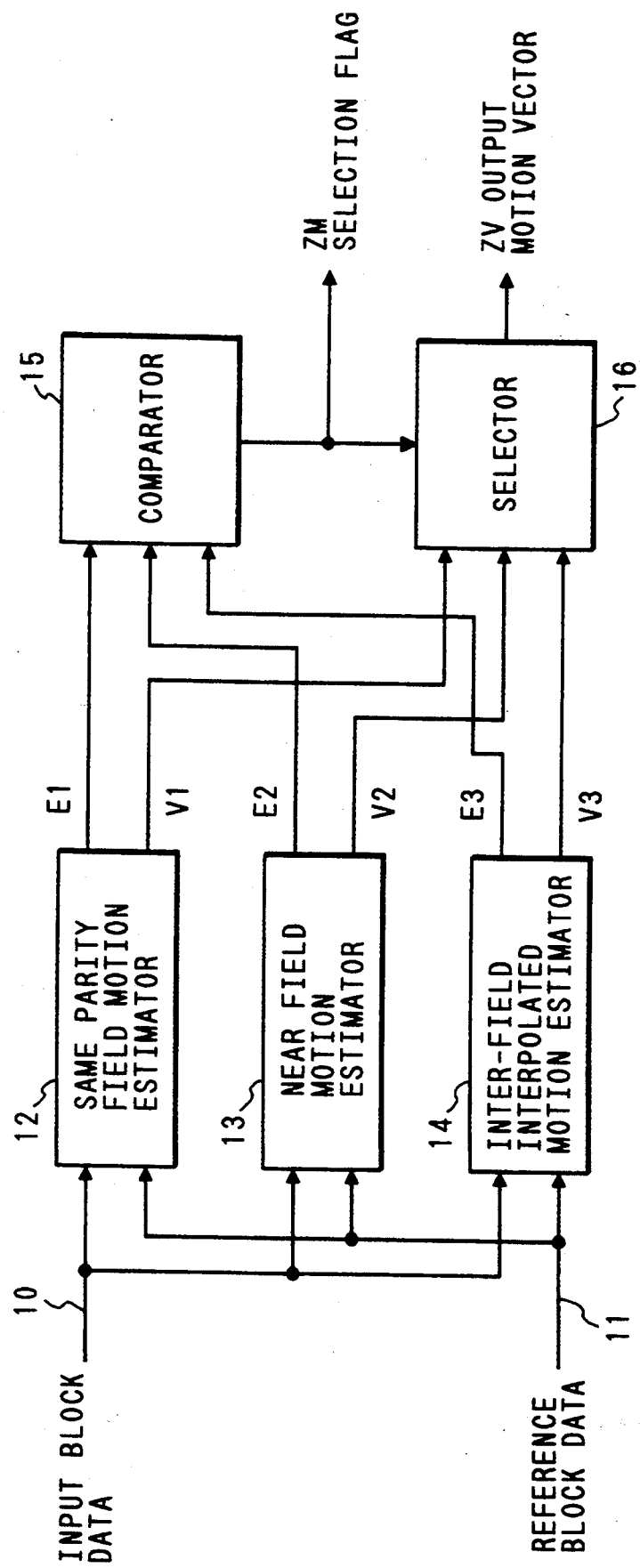
FIG. 4 is a block diagram showing a motion estimator embodying the invention.

Now, one embodiment of the invention will be described in detail with reference to the block diagram of FIG. 4. FIG. 4 shows a motion estimator, which is used as the motion estimator 78 shown in FIG. 1.

Referring to FIG. 4, there is shown an embodiment of the invention. Designated at 10 is input block data, and at 11 reference block data, these data each being of an interlaced picture. A same parity Field motion estimator 12 effects motion estimation of the input block data 10 using the reference block data 11 and outputs a motion vector V1 and a block prediction error E1. A near field motion estimator 13 effects motion estimation and outputs a motion vector V2 and a prediction error E2. An inter-field interpolated motion estimator 14 effects motion estimation and outputs a motion vector V3 and a prediction error E3.

The prediction errors E1 to E3 output from the same parity field, near field and inter-field interpolated motion estimators 12 to 14 are compared in a comparator 15. The comparator 15 selects the smallest one of the prediction errors E1 to E3 and outputs a selection flag ZM, a signal representing the selected prediction error. According to the selection flag ZM, a selector 16 outputs as motion vector ZV the motion vector from the motion estimator providing the smallest prediction error.

Figure 1:
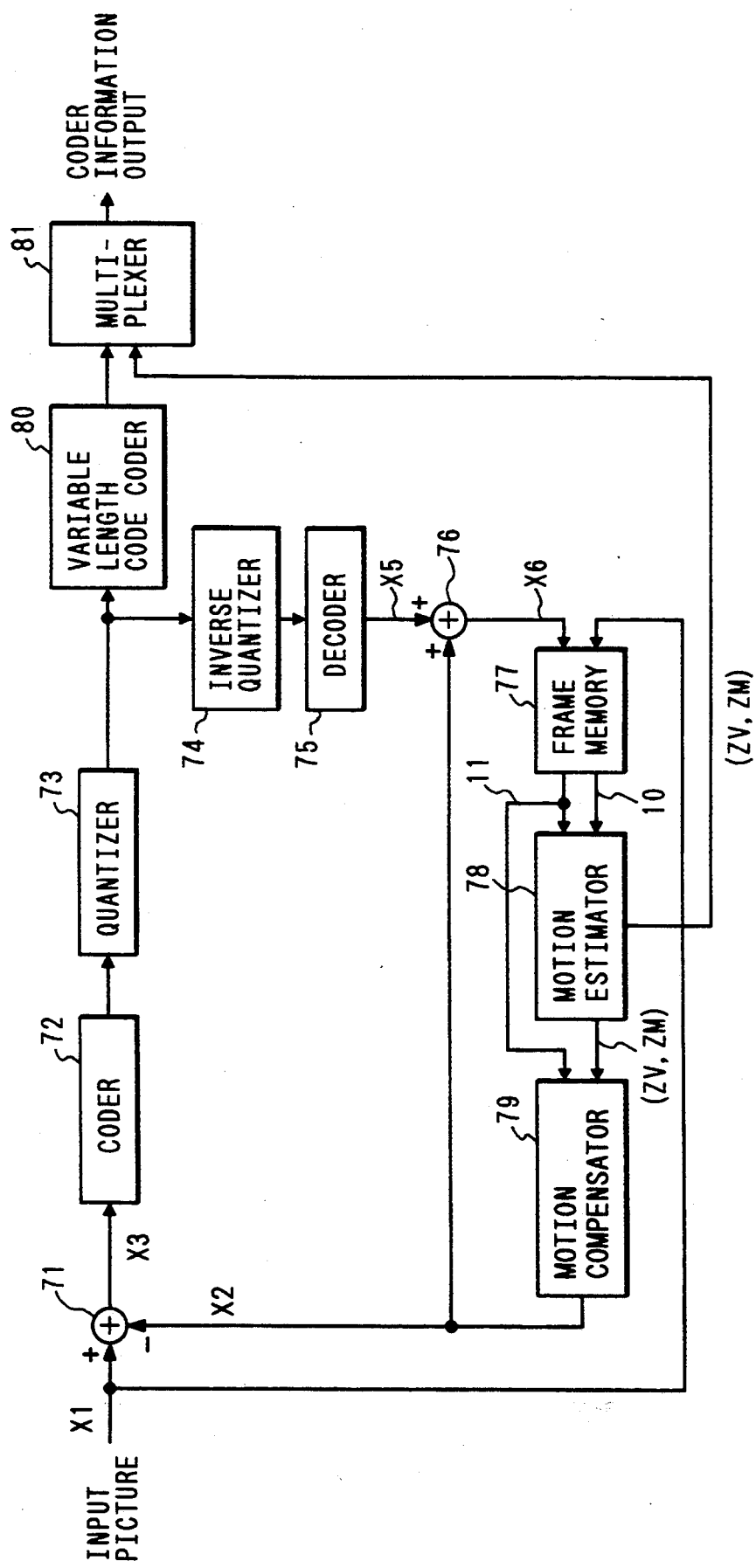
FIG. 1 is a block diagram showing a prior art interlaced video signal motion compensation prediction system.
Figure 2:
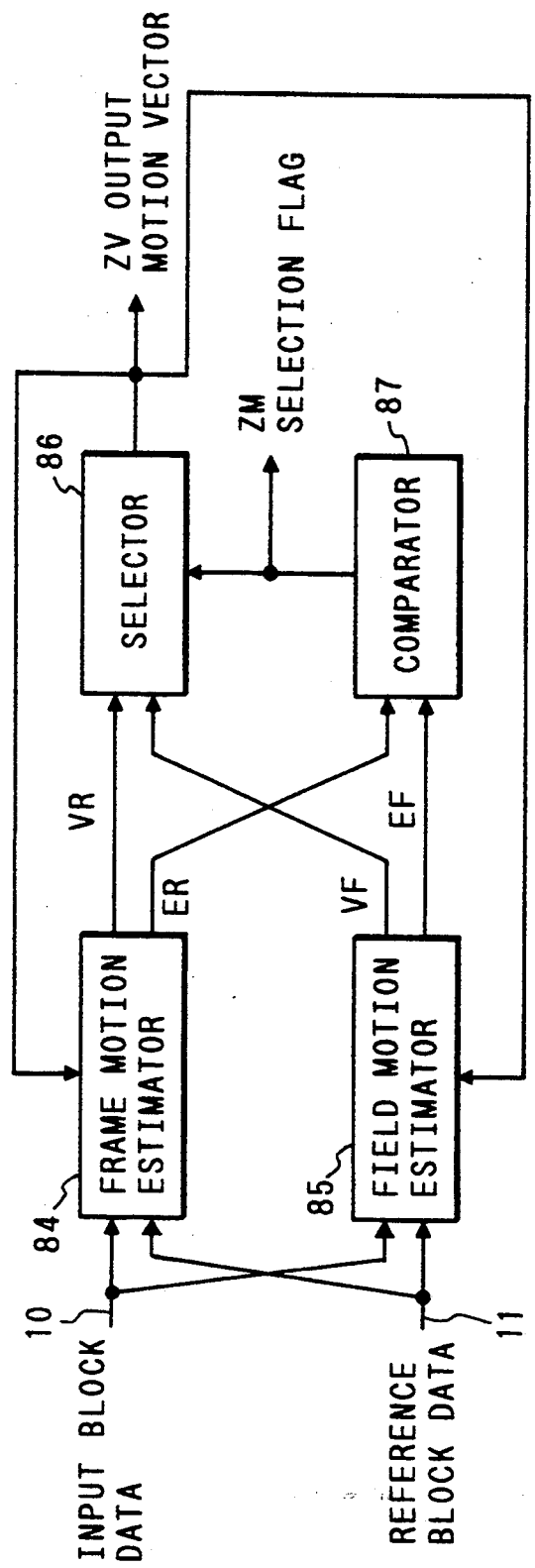
FIG. 2 is a block diagram showing a prior art motion estimator.
Figure 3:
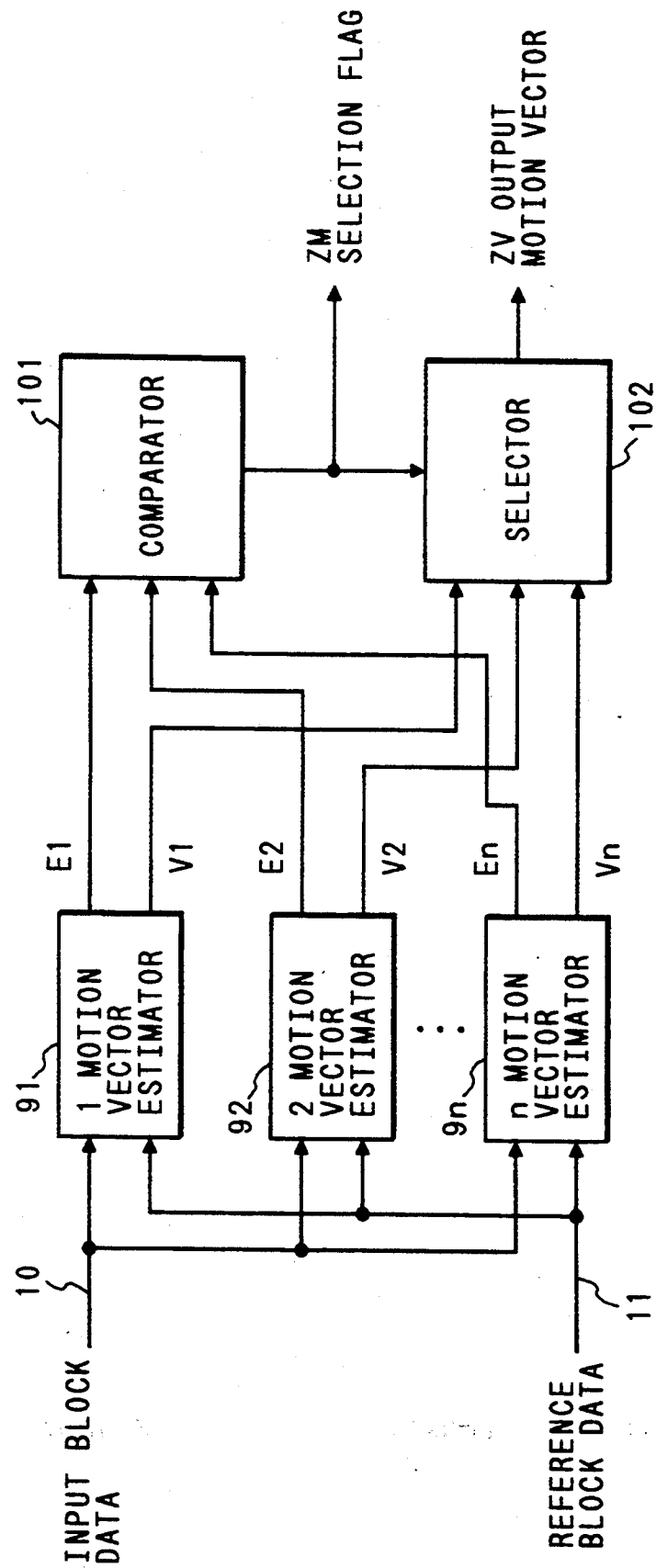
FIG. 3 is a block diagram showing a different prior art motion estimator.

After the selection of the motion vector ZV in the selector 16 according to the selection flag ZM, a motion compensator 79 shown in FIG. 1 effects motion compensation using as a prediction signal the reference block corresponding to the selected motion vector. At this time, the motion vector is used without any modification for the luminance signal. As for the chrominance signal, the block size is one half that for the luminance signal in the horizontal direction as described below. Therefore, the motion vector in the horizontal direction is changed to one half. The prediction signal is produced from the luminance and chrominance signals noted above.

Here, the outline procedure of a decoder (not shown), which receives and decodes coder information output from the multiplexer 81 is explained. According to the kind and motion vector quantity of the motion estimation supplied from the encoder, the decoder searches the pertinent reference block for motion compensation and prediction signal generation.

Main components of this embodiment will now be described in detail.

Figure 5:
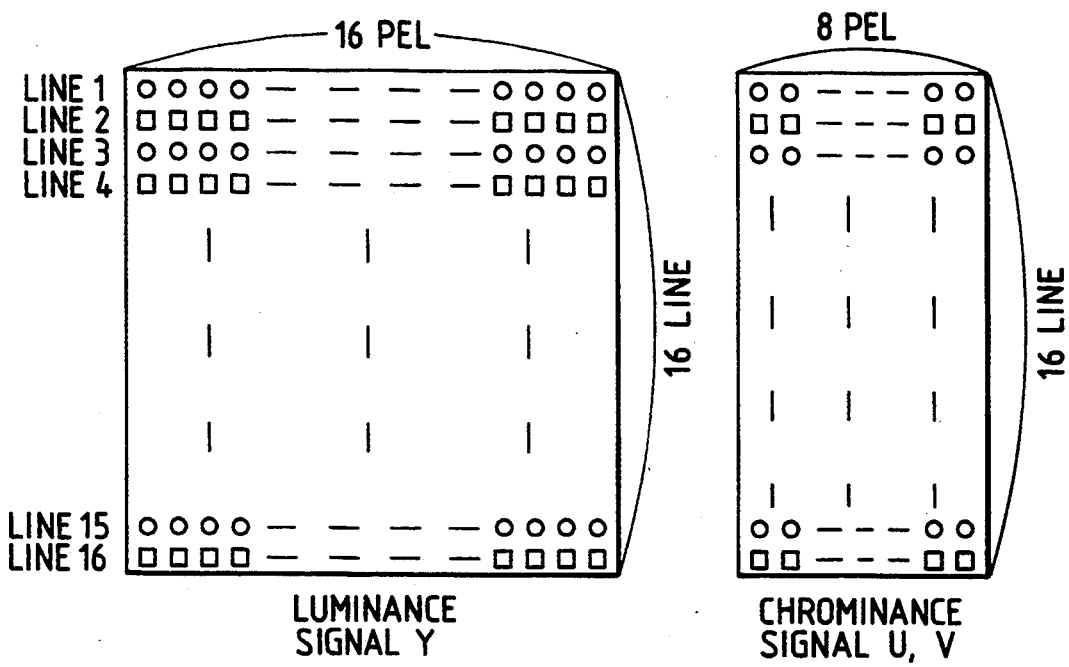
FIG. 5 is a view for explaining an example of input picture block data configuration.

FIG. 5 shows the configuration of the block data of the input picture in detail. As for the size of the input block, a luminance signal of 16 pels by 16 lines and two chrominance signals each of 8 pels by 16 lines constitute a macro-block. A series of coding operations is executed for each macro-block.

As shown in FIG. 5, the block is constituted by odd field data (shown as circles) on odd lines and even field data (shown by squares) on even lines. The frame block comprises alternate odd and even line data. The field block, on the other hand, comprises odd or even line data alone.

The reference block used for motion estimation comprises luminance signal alone. The block size is varied according to the range of search. For example, where the search range is 7 pels in the main and auxiliary scanning directions, the block size is 30 pels by 30 lines. As for the size of the prediction data that is obtained after the motion compensation, both the luminance and chrominance signals have configurations like those of the input block shown in FIG. 5.

Figure 6A:
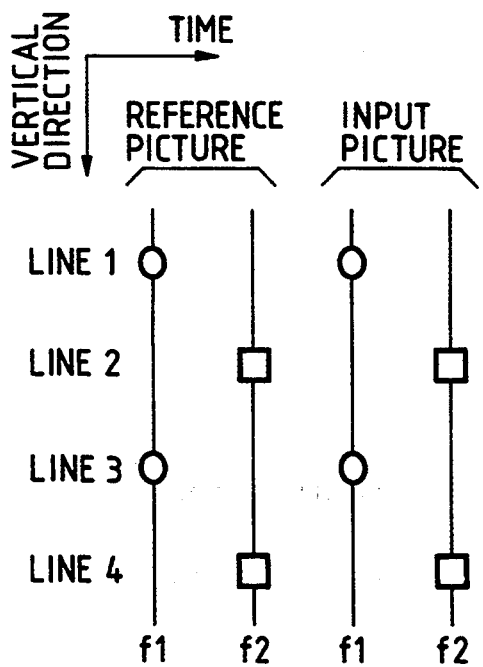
FIG. 6A and FIG. 6B are views showing block data configuration of part of input and reference picture block data in the vertical direction and time axis direction.

FIG. 6A shows block data of the input and reference pictures in the vertical and time axis directions. Data in odd field f1 (as shown by circles) are present in odd lines, and data in even field f2 (as shown by squares) are present in even lines.

Figure 7:
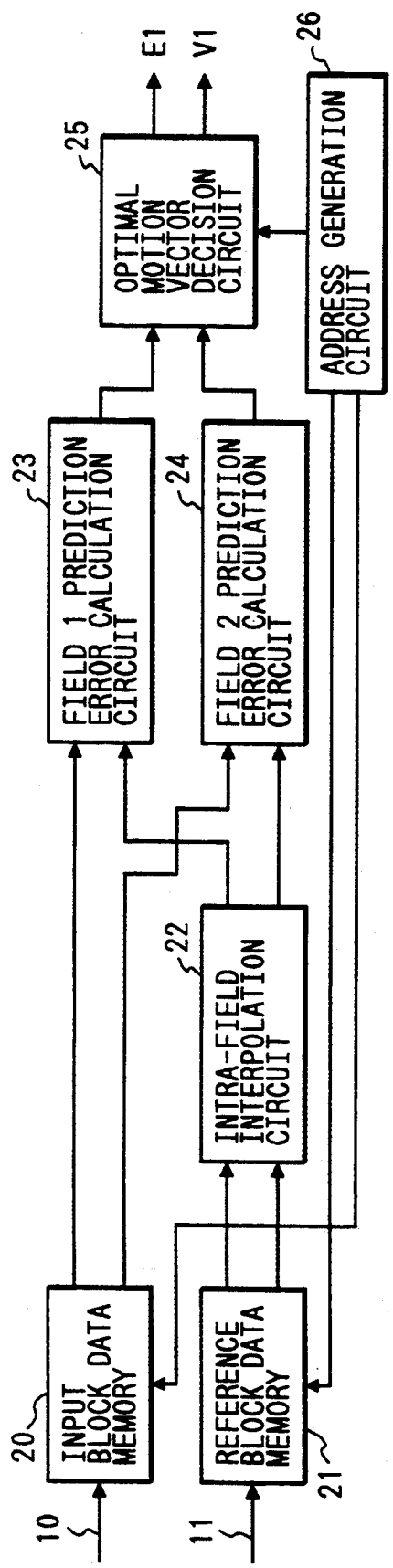
FIG. 7 is a block diagram showing a specific example of a same parity motion estimator.

FIG. 7 shows an example of the same parity field motion estimator 12. The same parity fields mean that they are all odd or even fields. The input block and reference block data 10 and 11 are once stored in respective input and reference block memories 20 and 21. Then, according to address information from an address generation circuit 26, each field data in a motion estimation area is taken out from the input block memory 20, while each field data in a search area is taken out from the reference block memory 21. These field data are fed to a field 1 and a field 2 prediction error calculation circuit 23 and 24 for prediction error calculation.

Figure 8A:
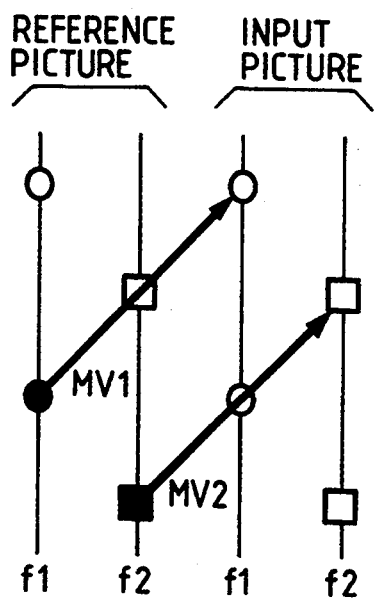
FIG. 8A and FIG. 8B are views for explaining the operational principles underlying the same parity motion estimator.

FIG. 8A shows the manner of obtaining the prediction error. As shown, with an input block signal of 16 pels by 16 lines, a prediction error signal is obtained from the odd field input data with respect to the odd field reference data and from the even field input data with respect to the even field reference data by using same vectors MV1 and MV2 for the odd and even fields f1 and f2 of the input picture. The prediction error signal is obtainable by accumulating the absolute values or squares of differences. In the above way, the field 1 and field 2 prediction error calculation circuits 23 and 24 derive prediction error signals between the same parity fields by using the same vectors.

An optimal motion vector decision circuit 25 obtains the sum of the two prediction error signals obtained in the field 1 and field 2 prediction error calculation circuits 23 and 24 and stores the sum as total prediction error. After completion of the search of all search points by the address generation circuit 26, the optimal motion vector decision circuit 25 compares the total prediction error at each search point to determine the minimum error position and outputs motion vector V1 and prediction error E1 thereof.

Figure 6B:
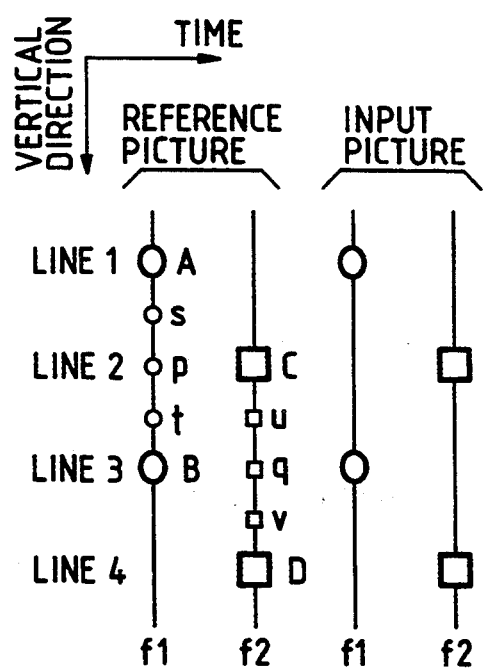

In this embodiment, it is further possible to improve the accuracy of motion estimation by making motion estimation with respect to interpolated pel blocks of fractional pel accuracy. The interpolation may be done as shown in FIG. 6B. In this case, it is done between original pels A and B or C and D on a vertical line in the same field with a fractional pel accuracy of $\frac{1}{2}$ by producing an interpolation pel p or q, thus producing an interpolated pel block. The vertical line interpolation signal is produced independently for odd and even lines such as $p=(A+B)/2$, $q=(C+D)/2$, .... In these calculations, it is possible to count fractions of 5 and over and disregard the rest for accuracy improvement. The accuracy of the motion estimation may further be improved by setting the fractional pel accuracy of the vertical line interpolation to $\frac{1}{4}$. In this case, further interpolation pels s to v are added as shown in FIG. 6B such that $s=(3\times A+B)/4$. As for horizontal interpolation between pels, the fractional pel accuracy is set up to $\frac{1}{2}$, and interpolation pels are produced as the average of the left and right pels.

Figure 8B:
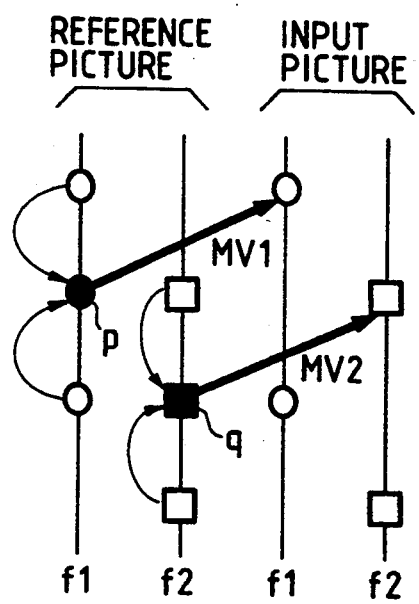

In the case of FIG. 7, an intra-field interpolation circuit 22 produces interpolation pel or pels between adjacent lines and adjacent pels in each field to produce an interpolated pel block of fractional pel accuracy. FIG. 8B shows a manner of motion estimation by producing interpolation pels p and q between adjacent lines and obtaining a prediction error signal by using the same vectors MV1 and MV2.

Figure 9:
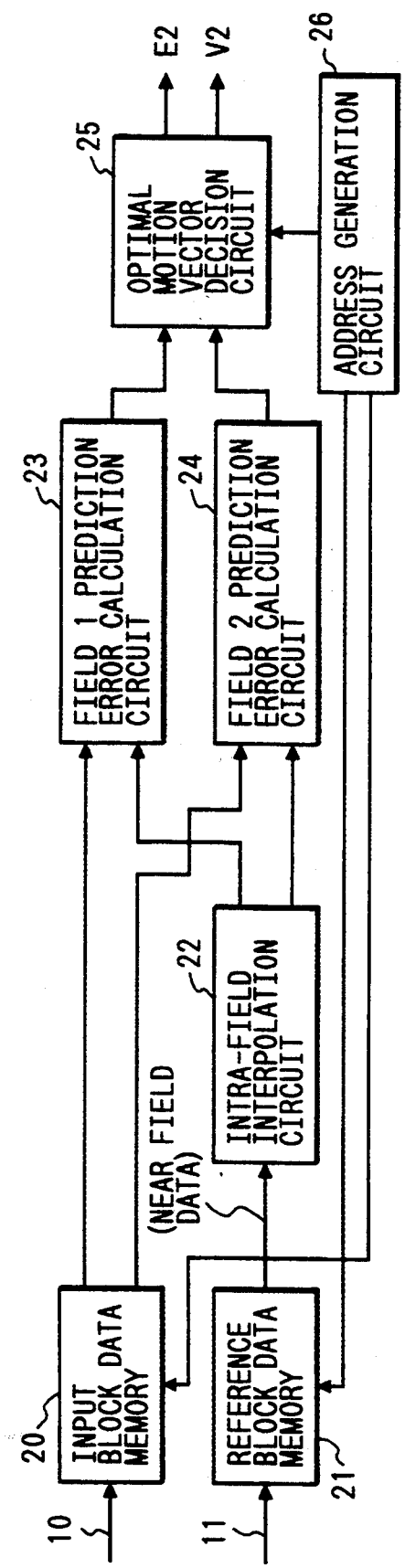
FIG. 9 is a block diagram showing an example of a near field motion estimator.

Now, the internal structure of the near field motion estimator 13 will be described with reference to the block diagram of FIG. 9. The input and reference block signals 10 and 11 are once stored in respective input and reference block data memories 20 and 21. Then, according to address information from an address generation circuit 26, each field data in a motion estimation area is taken out from the input block memory 20, while data in a search area in a field temporally near the input frame is taken out from the reference block memory 21, and the data thus taken out are fed to a field 1 and field 2 prediction error calculation circuits 23 and 24 for prediction error calculation.

Figure 10A:
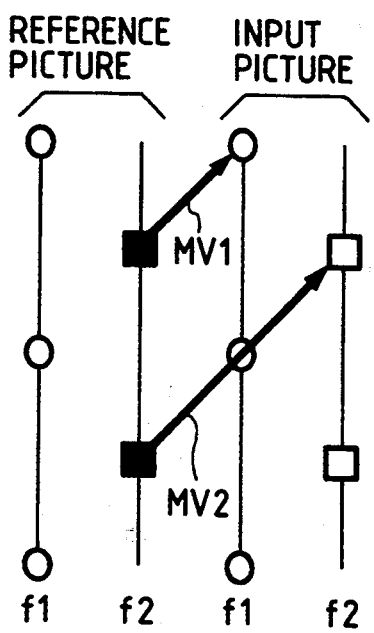
FIG. 10A and FIG. 10B are views for explaining the operational principles underlying the near field motion estimator.

As shown in FIG. 10A, with an input block signal of 16 pels by 16 lines, a prediction error signal is obtained from input data in both odd and even fields f1 and f2 of the input picture with respect to reference data of near field (i.e., field f2 in the case of FIG. 10A) by using parallel vectors MV1 and MV2. An optimal vector decision circuit 25 obtains the sum of the two prediction errors obtained from the field 1 and field 2 prediction error calculation circuits 23, 24 and stores the sum as the total prediction error. The total prediction error at each search point is compared to determine the minimum prediction error position, whereby motion vector V2 and prediction error E2 are output. The prediction error signal may be obtained by accumulating the absolute values or squares of differences.

As the motion vectors for each field, either vector of MV1 or MV2 is used as a basic vector, and the other vector is obtained by converting the basic vector according to the temporal distance ratio. For example, in the case of FIG. 10A the vector MV1 is used as the basic vector, and the other vector MV2 is obtained by converting the basic vector MV1 according to a temporal distance ratio k, that is, $MV2 = k \times MV1$.

In the case of FIG. 10A, the distance ratio is 1:2, that is, $k=2$. The distance ratio is determined absolutely according to the reference picture, and hence only one motion vector is coded.

Figure 10B:
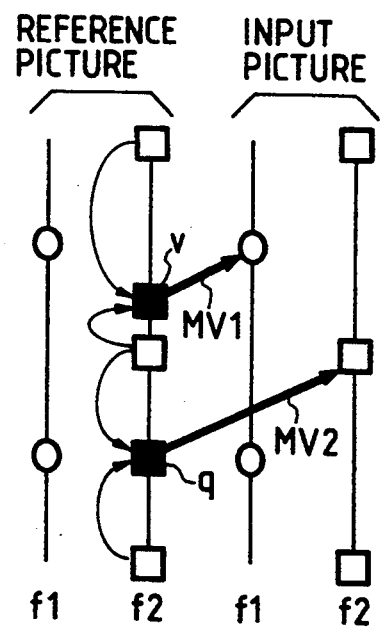

To improve the accuracy of motion estimation, it is possible to carry out motion estimation with respect to interpolated pel blocks of fractional pel accuracy. In this case, the intra-field interpolation circuit 22 produces interpolation pel or pels between adjacent lines and adjacent pels in a near field to produce an interpolated pel block. FIG. 10B shows the manner of motion prediction by producing interpolation pels v and q between adjacent lines.

Figure 11:
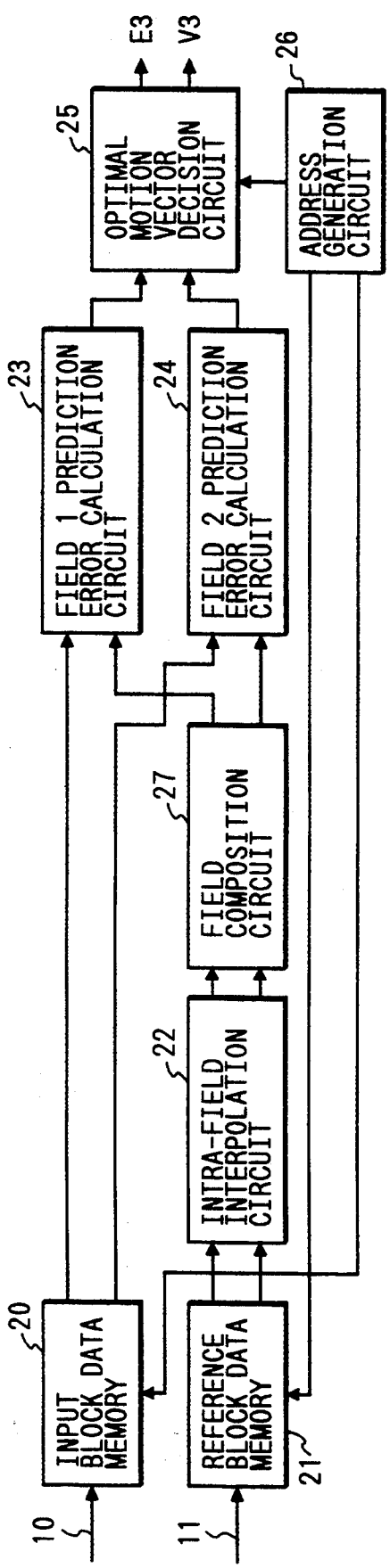
FIG. 11 is a block diagram showing an example of an inter-field interpolated motion estimator.

Now, the internal structure of the inter-field interpolated motion estimator 14 will be described with reference to FIG. 11. The input and reference block signals 10 and 11 are once stored in respective input and reference block data memories 20 and 21. Then, according to address information from an address generation circuit 26, each field data in a motion estimation area is taken out from the input block memory 20 while field data in a search area is taken out from the reference block memory 21. The reference field data is fed to a field composition circuit 27 to combine data in both odd and even fields, which is fed as prediction data to a field 1 and field 2 prediction error calculation circuit 23 and 24 for prediction error calculation.

Figure 12A:
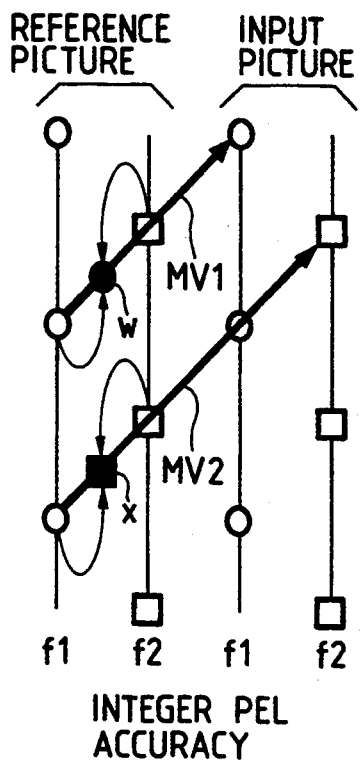
FIG. 12A and FIG. 12B are views for explaining the operational principles underlying the inter-field interpolated motion estimator.

In this case, as shown in FIG. 12A, with an input block signal of 16 pels by 16 lines, a prediction error signal is obtained from odd and even field data of the input picture with respect to reference pels w and x, which are obtained by combining data in both odd and even fields of the reference picture, by using parallel vectors. An optimal motion vector decision circuit 25 obtains the sum of the two prediction errors obtained in the field 1 and field 2 prediction error calculation circuits and stores the sum as the total prediction error. The total prediction error at each search point is compared to obtain the minimum prediction error position, whereby motion vector V3 and prediction error E3 are output. The even and odd field data of the reference picture may be combined by utilizing the simple mean or mean with weighting according to the temporal distance. In this case, it is possible to utilize the accumulation of the absolute values or squares of differences for the prediction error signal.

As for the motion vectors for each field, either vector of MV1 or MV2 is used as a basic vector, and the other vector is obtained by converting the basic vector according to the temporal distance ratio. For example, in FIG. 12A a vector MV1 between field f1 of the input picture and field f1 of the reference picture is used as the basic vector, that is, MV1. The reference data necessary for the field f1 of the input picture is synthesized from the data in the field f1 of the reference picture based on MV1 and data of the field f2 at the position of projection of MV1 onto the field f2 of the reference picture.

A vector MV2 between the field f2 of the input picture and the field f1 of the reference picture is obtained by converting the vector MV1 according to a temporal distance ratio k, that is, $MV2 = k \times MV1$. In the case of FIG. 12A, the distance ratio k is $k=3/2$. The reference data necessary for the field f2 of the input picture is synthesized from the data in the field f1 of the reference picture based on MV2 and data in the field f2 at the position of projection of the vector MV2 on the field of the reference picture.

Figure 12B:
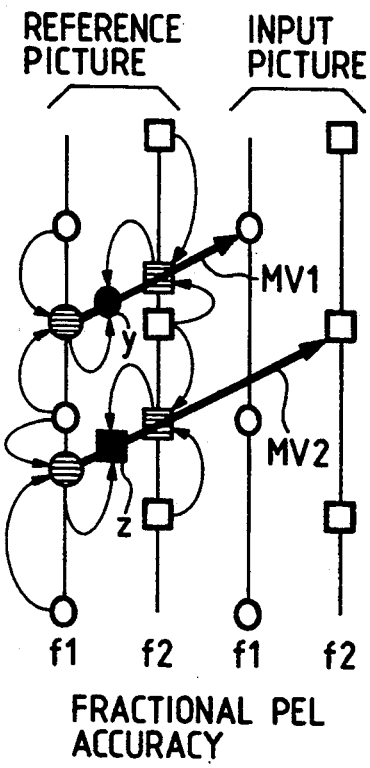

Further, since the distance ratio is determined absolutely according to the reference picture, only one motion vector is coded. To improve the accuracy of motion estimation, it is possible to carrying motion estimation with respect to interpolated pel blocks of fractional pel accuracy. In this case, an intra-field interpolation circuit 22 produces interpolation pel or pels between adjacent lines and adjacent pels in each field to obtain an interpolated pel block. FIG. 12B shows the manner of motion estimation by producing interpolation pels y and z between adjacent lines and adjacent pels.

This embodiment of the invention can be modified variously. For example, it is possible to adopt various block sizes, such as 32 pels by 32 lines, as well as the size of 16 pels by 16 lines. As for the chrominance signal block, in the case of 8 pels by 8 lines, for instance, the horizontal and vertical motion vectors obtained in motion estimation may be made to be one half to produce a prediction signal.

Figure 13:
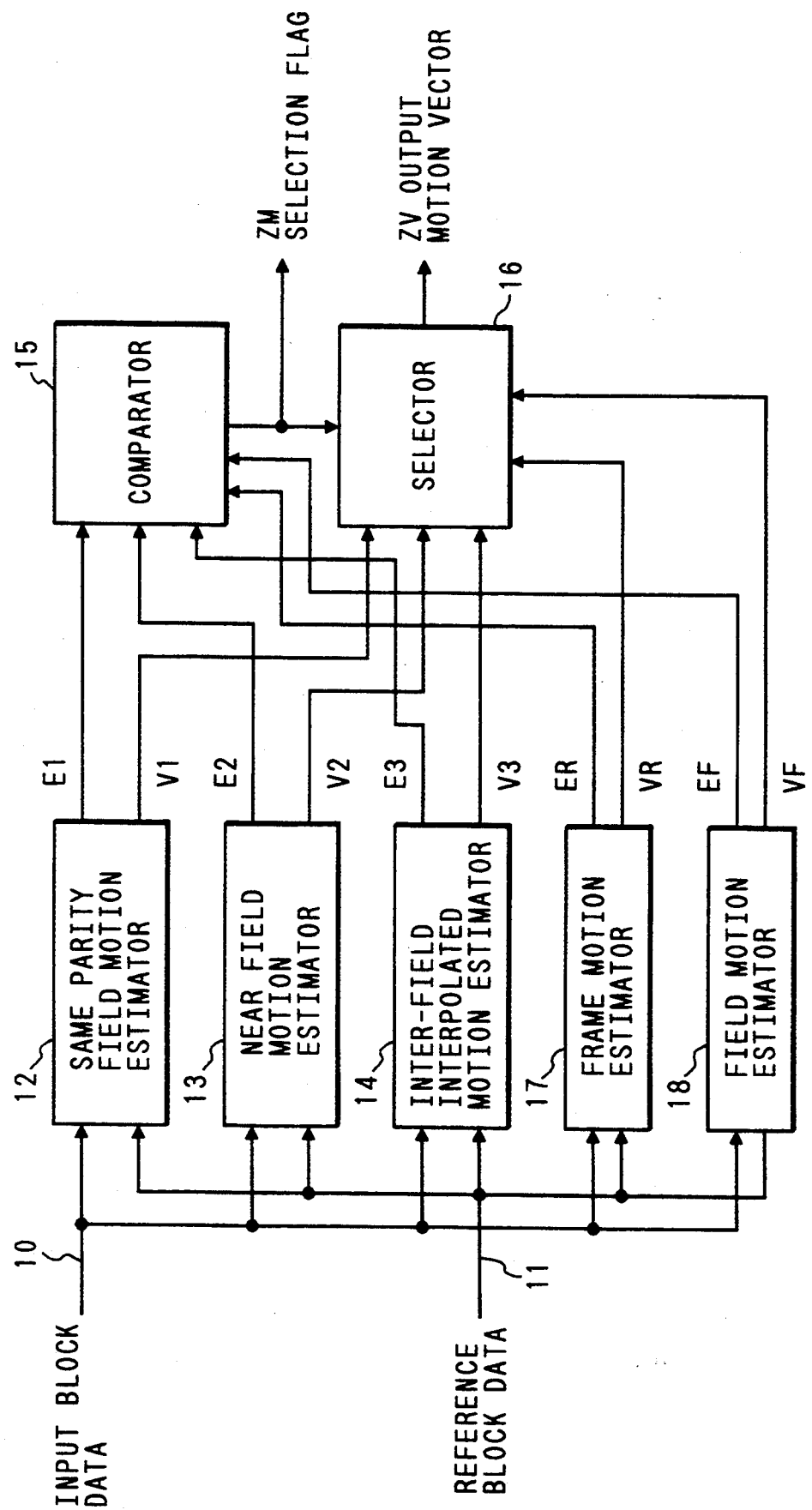
FIG. 13 is a block diagram showing a motion estimator in a second embodiment of the invention.

A second embodiment of the invention will now be described. As shown in FIG. 13, in this embodiment a frame and a field motion estimator 17 and 18 are provided in addition to same parity field, near field and inter-field interpolated motion estimators 12 to 14. Prediction errors E1 to E3, ER and EF from the motion estimators 12 to 14, 17 and 18 are input to a comparator 15. The comparator 15 selects the smallest one of these prediction errors and outputs a selection flag ZM. According to the selection flag ZM, the selector 16 selects one of motion vectors V1 to V3, VR and VZ that is provided from the smallest prediction error motion estimator and outputs the selected motion vector as ZV.

Figure 14:
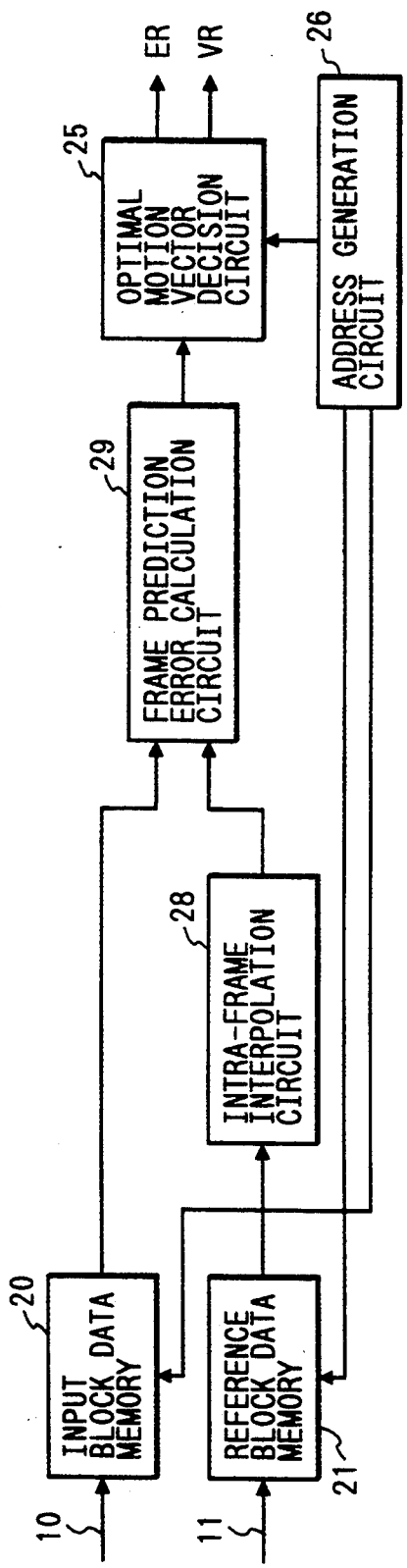
FIG. 14 is a block diagram showing an example of a frame motion estimator.

The frame motion estimator 17 has all internal structure as shown in FIG. 14. Here, the input and reference block data 10 and 11 are once stored in respective input and reference block memories 20 and 21. Then, according to address information from an address generation circuit 26, frame data in a motion estimation area is taken out from the input block memory 20 while that in a search area is taken out from the reference block memory 21, and these data are fed to a frame prediction error calculation circuit 29 for prediction error calculation.

Figure 15A:
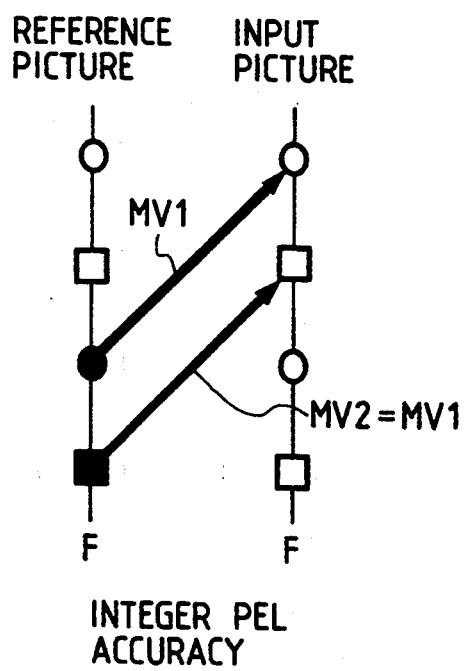
FIG. 15A and FIG. 15B are views for explaining the operational principles underlying the frame motion estimator.

In this case, with frame picture F as shown in FIG. 15A, with alternatively arranged odd and even fields (odd field data being represented by white and black circles and even field data being represented by white and black squares), prediction error is obtained between input and reference picture frames. In an optimal vector decision circuit 25 a prediction error signal at each point obtained by searching the reference picture with address information from an address generation circuit 26 is compared to obtain the point of the minimum prediction error, thereby outputting motion vector VR and prediction error ER.

Figure 15B:
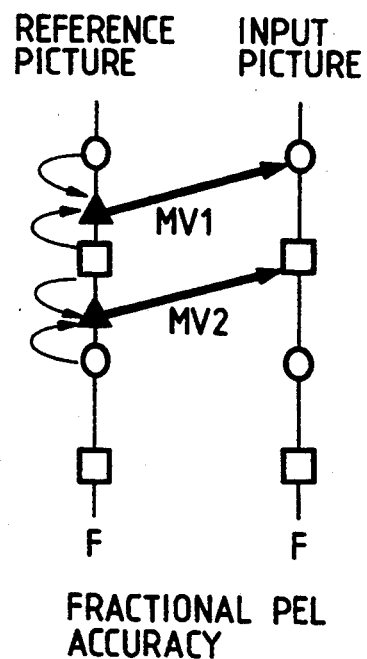

To improve the motion estimation accuracy, it is possible to perform motion estimation of interpolated pel blocks of fractional pel accuracy. In this case, an intra-frame interpolation circuit 28 produces interpolation pel or pels between adjacent lines and adjacent pels in the same frame and thus provides a fractional pel accuracy interpolated pel block. FIG. 15B shows the manner of motion estimation by producing interpolation pels between adjacent lines.

Figure 16:
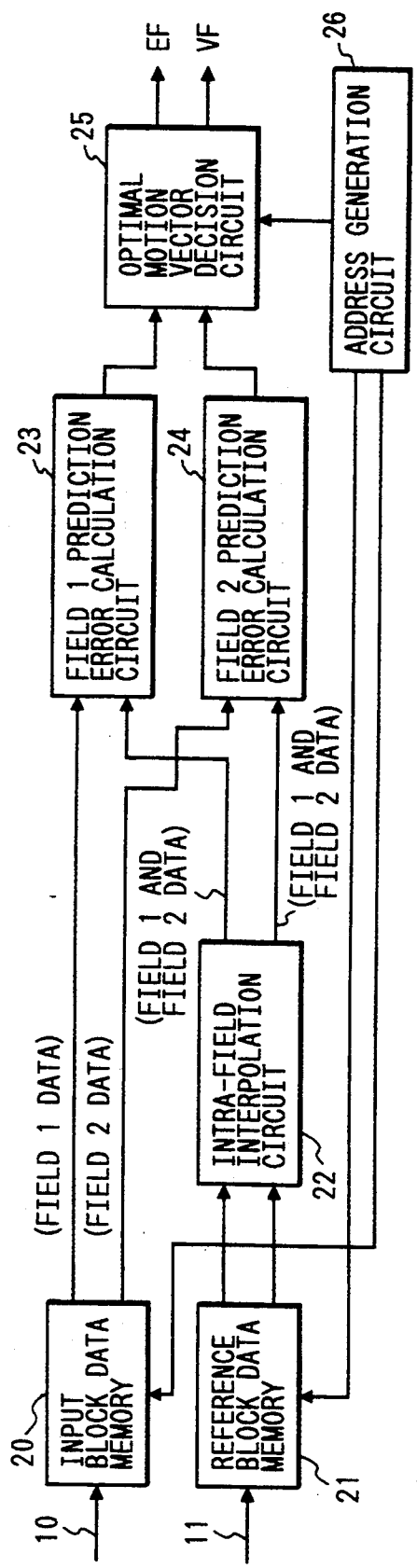
FIG. 16 is a block diagram showing an example of a field motion estimator.

FIG. 16 shows the internal structure of the field motion estimator 18. Here, the input and reference block data 10 and 11 are once stored ill respective input and reference block memories 20 and 21. Then, according to address information from an address generation circuit 26, field data of a motion estimation area is taken out from the input block memory 20 while field data of a search area is taken out from the reference block memory 21, and these data are input to field 1 and field 2 prediction error calculation circuit 23 and 24 for calculation of the prediction errors in the individual fields.

Figure 17A:
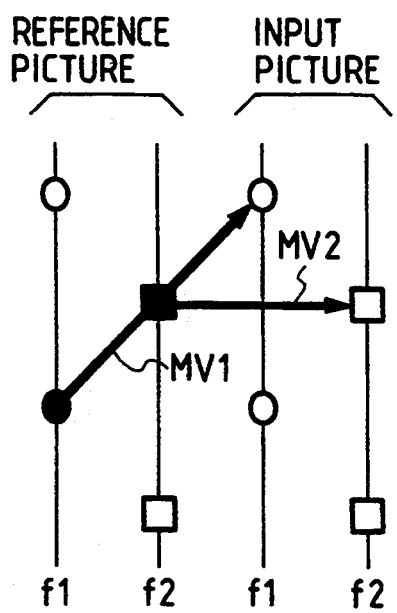
FIG 17A and 17B are views for explaining the operational principles underlying the field motion estimator.

In this case, as shown in FIG. 17A, a prediction error signal is obtained from odd field input data with respect to odd or even field reference data and from even field input data with respect to even or odd field reference data by using different vectors (MV1, MV2) for odd and even fields f1 and f2 of the input picture. The optimal vector decision circuit 25 obtains the sum of the two prediction errors from the field 1 and field 2 prediction error calculation circuits and stores the sum as the total prediction error. The total prediction error at each search point is compared to obtain the position of the smallest prediction error, whereby motion vector VF corresponding to the input field and prediction error EF are output.

Figure 17B:
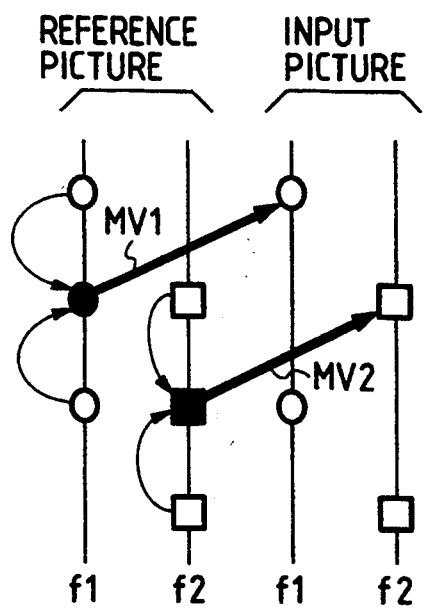

To improve the accuracy of motion estimation, it is possible to perform motion estimation of fractional pel accuracy interpolated pel blocks. In this case, an intra-field interpolation circuit 22 produces interpolation pel or pels between adjacent lines and adjacent pels in each field to provide a fractional pel accuracy interpolated pel block. FIG. 17B shows the manner of motion estimation by the interpolation pel production between adjacent lines.

In this embodiment, which additionally comprises the frame and field motion estimators 17 and 18, it is possible to improve the accuracy of motion prediction over the first embodiment. In this instance, however, increase of motion estimation system flags ZM and increase of calculation time are liable.

Now, a third embodiment of the invention will be described. In this embodiment, an opposite parity field motion estimator and far field motion estimator, as shown in FIGS. 18A, 18B, and 19A, 19B are provided in addition to the same parity field, near field and interfield motion estimators 12 to 14.

Figure 18A:
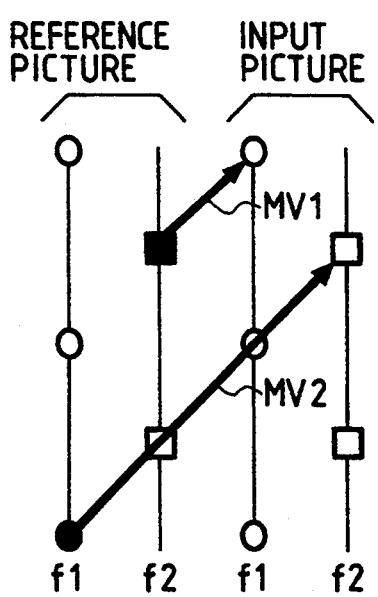
FIG. 18A and FIG. 18B are views for explaining the operational principles underlying an inverse parity field motion estimator used in a third embodiment of the invention.

In this instance, the opposite parity field motion estimation shown in FIG. 18A is inverse to the same parity field motion estimation in FIG. 8, that is, motion estimation is done of odd field input data with respect to even field reference data and of even field input data with respect to odd field reference data by using the same motion vectors for the odd and even fields of the input picture.

Figure 18B:
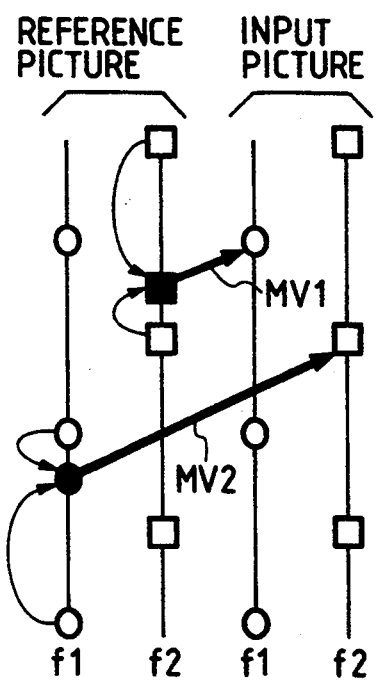

It is also possible to perform motion estimation in fractional pel accuracy as shown ill FIG. 18B in order to improve the motion estimation accuracy.

Also, the far field motion estimation in FIG. 19A is inverse to the near field motion estimation in FIG. 10, that is, motion estimation is done of both odd and even field input data with respect to temporally far field reference data (i.e., field f1 in the case of FIG. 19) by using the same motion vectors for the odd and even fields of the input picture.

It is also possible to perform motion estimation in fractional pel accuracy as shown in FIG. 19B in order to improve the motion estimation accuracy.

According to the invention, the temporal distance or position of the reference and input pictures are as desired. For example, it is possible to use a reference picture distant by 6 fields or use a temporally later reference picture. In the latter case, temporally backward motion estimation is done.

Further, it is free to use any number of reference pictures. For example, a plurality of reference pictures temporally leading and/or lagging behind the input picture may be used to obtain optimal prediction pictures. It is further possible to use as a prediction picture a new picture obtained by combining the individual optimal prediction pictures after temporal filtering thereof.

Further, it is possible to use a motion vector of the left or upper adjacent block to cause deviation of estimation start position of the reference block for improving the reliability of motion estimation and also to reduce the range of motion estimation for improving the processing efficiency.

Further, in lieu of carrying out motion estimation at all integral and fractional pel accuracy search points in the search area, two-stage motion estimation as described below may be carried out to reduce the number of calculations to simplify the motion estimation and reduce the time required therefor.

First stage:

The same parity field motion estimation alone is executed with integral pel accuracy using the same parity filed motion estimator 12. Then the motion vector of the minimum prediction error is obtained.

Second stage:

Using the motion vector obtained ill the first stage, estimation start position deviation is caused, and the three motion estimators 12 to 14 are caused to perform motion estimation individually. In this case, motion estimation is caused at a total of 21 positions in a ±0.5 pel range with a pel accuracy of ½ in the horizontal direction and in a ±0.75 pel range with a pel accuracy of ¼ in the vertical direction.

The same parity field motion estimator 12 used in the first stage may be replaced with a different motion estimator, for instance the frame motion estimator 17.

Further, for motion estimation on the encoder side, it is possible to use two different reference pictures, one being a reference picture based on local decoding value after inverse transform and the other being an original picture without being coded. As for the combination of reference pictures, in the above two stages of motion estimation it is possible to use an original picture in the first stage and a locally decoded picture in the second stage.

A fourth embodiment of the invention will now be described with reference to the block diagram of FIG. 20. Referring to the Figure, designated at 10 is input block data, and at 11 reference block data. These data form interlaced video. A 1-vector motion estimator 31 performs motion estimation of block signals of the input and reference pictures to output motion vector VI and block prediction error E1. A 2-vector motion estimator 32 performs motion estimation to output motion vector V2 comprised of two vectors and prediction error E2. Likewise, an n-vector motion estimator 3n performs motion estimation to output motion vector Vn comprised of n vectors and prediction error En.

The 1-vector motion estimator 31 uses one or more reference pictures to output a motion vector predicting motion between input and reference picture blocks and an error between predicted and input pictures. Likewise, the 2-vector motion estimator 32 uses two or more reference pictures to predict one picture, and the n-vector motion estimator 3 uses n or more reference pictures to predict one picture.

Prediction errors E1, E2 ..., En output from the 1-, 2-, ..., n-vector motion estimators 31, 32 ..., 3n are input to a pre-processor 41, and the individual prediction errors are given handicap values corresponding to the number of vectors according to coded information CI. The signals given the handicap values are compared in a comparator 42 for selection of one of them for each block, and a selection flag ZM indicative of the selected signal is output. According to the result obtained in the comparator 42, a selector 43 effects motion vector selection to output motion vector ZV.

Main components of this embodiment will now be described in detail.

The 16 pels by 16 lines block signal input to the 1-, 2-, ..., n-vector motion estimators are searched with respect to the reference picture by using one, two ..., n vectors, respectively. In this case, the reference picture may be a temporally preceding or succeeding one. Further, two or more temporally preceding or succeeding pictures may be used as reference pictures so long as they can be expressed by one, two ..., n vectors.

Figure 21:
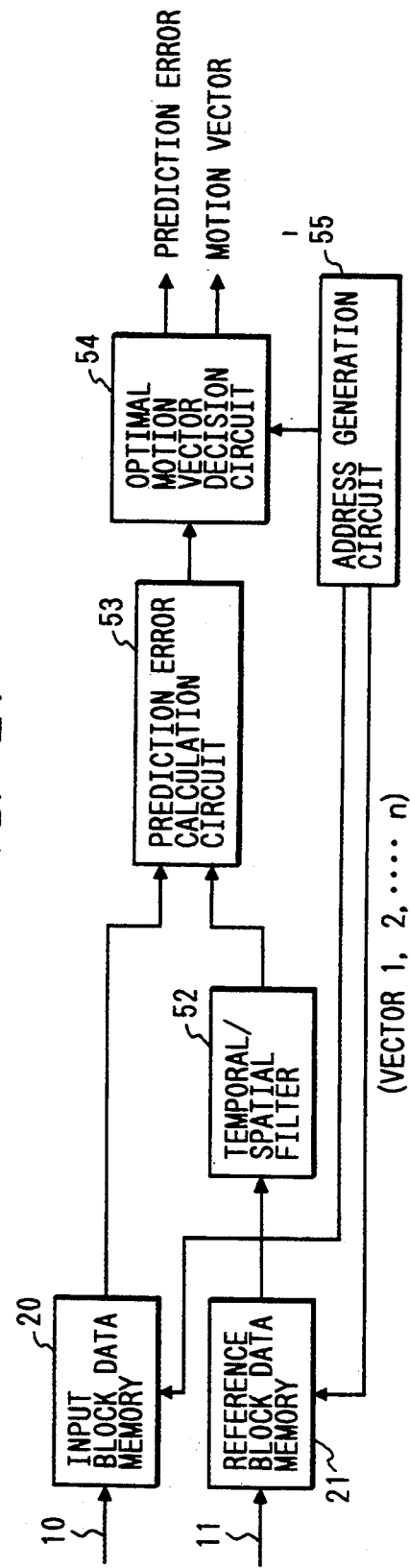
FIG. 21 is a block diagram showing an example of 1 to n vector motion estimators.

The internal structure of the 1-, 2-, ..., n-vector motion estimators 31, 32 ..., 3n are shown in FIG. 21. FIG. 21 typically shows one of the motion estimators 31, 32 ..., 3n. The input and reference pictures are once stored in input and reference block memories 20 and 21. According to address information from an address generation circuit 55, input and reference picture data for motion estimation are taken out.

Then, in the case of the 1-vector motion estimator 31, a temporal/spatial filter 52 filters reference picture data if so desired, and a prediction error calculation circuit 53 calculates the error between the input and reference pictures. In the case of the 2-vector motion estimator 32, the temporal/spatial filter 52 filters reference picture data corresponding to two vectors to obtain a synthesized predicted picture, and the prediction error calculation circuit 53 calculates the error between the input and reference pictures. In the case of the n-vector motion estimator 3n, the temporal/spatial filter 52 filters reference picture data corresponding to n vectors to produce a synthesized predicted picture, and the prediction error calculation circuit 53 calculates the error between the input and reference pictures.

An optimal vector decision circuit 54 compares the prediction error signal at each search point to obtain a position of the minimum prediction error, thus outputting motion vector V1 consisting of a single motion vector and prediction error E1, motion vector V2 consisting of two vectors and prediction error E2 ..., and motion vector Vn consisting of n vectors and prediction error En. The prediction error signal may be produced by accumulating the absolute values or squares of differences. A comparator 42 compares the prediction error values E1, E2, ..., En from the motion estimators 31, 32 ..., 3n and selects one thereof having smaller prediction error value to output a determined selection flag ZM. At this time, the following judgment conditions are used.

(1) If $E1 < T1$, then $ZV = V1$, and
(2) else $ZV = Vx$ where Vx is a motion vector giving min (E1, E2', ... En'), where $$E2' = E2 + T2$$
$$\vdots$$
$$En' = En + Tn$$

T1 is a threshold value, and T2 ..., Tn are handicap values, which are usually $T2 < T3 < ... < Tn$. These values are determined according to coded information CI, such as the number of vectors, accumulated bit count, quantization coefficient, kind of prediction scheme, etc. For example, when the accumulated bit count and quantization coefficient are large, the threshold value T1 and also the handicap values T2, T3, ..., are set to be large to avoid coding efficiency reduction due to bit count increase with increase of the number of vectors. On the other hand, if the values noted above are small, T1, T2, ..., Tn may be set to be comparatively small.

Further, where the permissible number of vectors is small, for instance around 2, the threshold value T1 may be set to be greater than T1 in the case where the permissible vector number is large, thus changing the selectivity with respect to the number of vectors to set a balance point corresponding to the permissible vector number. Further, as for the kind of the predicted picture, in the case of prediction from temporally distant picture, for instance, the accuracy of motion is not so high. In this case, therefore, the permissible vector number may be set to be rather small. In addition, high values of T1, T2, ..., Tn may be set to reduce the bit count of motion vector and distribute the residual information quantity to other coding such as transform coding. On the other hand, in the case of prediction from temporally near picture, it is possible to set rather small values of T1, T2, ..., Tn.

However, where a plurality of different motion compensations may be made by using the same number of vectors, a handicap value is given for each motion compensation scheme. For example, if the permissible number of vectors is two, where a plurality of different motion compensations are possible with frame and field vectors, the motion vector Vx in (2) above may be min (E1, E21', E22', ..., En') where $$E21' = E21 + T21$$
$$E22' = E22 + T22$$
$$\vdots$$
$$En' = En + Tn$$

where E21, E22, ... are prediction errors of the motion estimators 31, 32, ..., and T21, T22, ... are respective handicap values.

In this case, by giving the prediction error E21, which is obtained with frame vector for prediction from both temporally preceding and succeeding reference pictures by using a single motion vector for each reference picture, and the prediction error E22, which is obtained with field vector for prediction from either temporally preceding or suceeding reference picture by using two motion vectors, different handicap values T21 and T22 respectively, priority may be given to either the frame or the field vector.

Of this embodiment, various modifications are possible. For instance, it is possible to adopt various block sizes such as 32 pels by 32 lines as well as 16 pels by 16 lines.

Further, E2', ..., En' may be set such that $$E2' = C2 \times E2 + T2,$$
$$\vdots$$
$$En' = Cn \times En + Tn$$

That is, E2, ..., En may be multiplied by certain factors C2, ..., Cn, and the handicap values T2 ..., Tn may be added to the products. In this way, it is possible to obtain finer control.

As has been described in the foregoing, it is possible to obtain highly accurate motion estimation on a picture involving comparatively gentle motion with the same parity field motion estimation, inter-field interpolated compensation motion estimation and so forth. Further, by using the near field motion estimation and inter-field interpolated motion estimation, highly accurate motion detection is possible on an accelerated quick motion picture posing problems in the conventional motion compensation with sole Frame signal. Further, according to the invention, in any motion estimation only a single vector is necessary for each block. It is thus possible to reduce the burden of the vector quantity, which has been posing problems in the conventional motion compensation with sole field signal, to one half, thus permitting improvement of the picture quality and reduction of the transmitted information quantity.

Further, according to the invention the prediction errors of a plurality of motion estimations are given threshold values or handicap values for preferential selection of a motion compensation prediction with the smallest number of vectors among motion predictions with substantially the same prediction error. Thus, it is possible to realize reduction of the code quantity and improvement of the coding efficiency compared to the prior art motion compensation system, which is based solely on the magnitude of the prediction error and uses a large number of vectors.

As an example of effects according to the invention, when ISO test video sequences (flower garden, bicycle) were coded under the "CCIR601" video signal format condition and with a bit rate of 4 Mbits/sec., the video signal quality (i.e., signal-to-noise ratio) could be improved by 0.5 to 1.0 dB while reducing the motion vector information transmission quantity by 30 to 60% compared to a system adaptively using frame and field motion compensations.

What is claimed is:

1. An interlaced video signal motion compensation prediction system for block-by-block motion compensation by using an input and a reference picture comprising:

means for storing the input and the reference pictures for each field block;

same parity field motion estimation means for performing motion estimation for each said field block between same parity field blocks of said input and reference pictures by using the same vectors for each input field block, thus obtaining motion vectors and obtaining the sum of field prediction errors from said motion estimation;

near field motion estimation means for performing motion estimation for each said field block with respect to the temporally nearest field block of said reference picture to said input picture by using the same vectors for each field, thus obtaining motion vectors and obtaining the sum of field prediction errors from said near field motion estimation;

inter-field interpolated motion estimation means for performing motion estimation for each said field block between a picture obtained by combining two field pictures of said reference picture and input picture by using the same vectors for each field, thus obtaining motion vectors and obtaining the sum of field prediction errors from said inter-field interpolated motion estimation; and means for comparing the prediction errors output from each of said motion estimation means and selecting a selection flag indicative of the smallest prediction error and the motion vectors from said motion estimation means providing said smallest prediction error; and means for transmitting a selection flag indicative of the selected motion estimation means and the motion vectors corresponding to said selection flag.

2. The interlaced video signal motion compensation prediction system according to claim 1, which further comprises:

frame motion estimation means connected in parallel to said same parity, near field, and inter-field interpolated motion estimation means for obtaining for each block a prediction error signal between reference and input picture frames.

3. The interlaced video signal motion compensation prediction system according to claim 2, which comprises:

further means in said frame motion estimation means for producing an interpolated pel block of fractional pel accuracy with respect to a reference picture block;

thereby improving the accuracy of motion estimation.

4. The interlaced video signal motion compensation prediction system according to claim 3, wherein:

motion estimation is performed in a first state of executing motion estimation of integer pel accuracy with respect to a reference picture block to obtain a motion vector, and is performed in a second stage of executing motion estimation by using interpolation pel or pels of fractional pel accuracy near the start position of the motion vector obtained in said first stage, thereby permitting reduction of the processing time of motion estimation.

5. The interlaced video signal motion compensation prediction system according to claim 1, which further comprises:

field motion estimation means connected in parallel to said same parity, near field, and inter-field interpolated motion estimation means for obtaining for each block a prediction error signal between reference and input picture fields.

6. The interlaced video signal motion compensation prediction system according to claim 5, which comprises:
further means in said field motion estimation means for producing an interpolated pel block of fractional pel accuracy with respect to a reference picture block;
thereby improving the accuracy of motion estimation.

7. The interlaced video signal motion compensation prediction system according to claim 6, wherein:
motion estimation is performed in a first state of executing motion estimation of integer pel accuracy with respect to a reference picture block to obtain a motion vector, and is performed in a second stage of executing motion estimation by using interpolation pel or pels of fractional pel accuracy near the start position of the motion vector obtained in said first stage, thereby permitting reduction of the processing time of motion estimation.

8. The interlaced video signal motion compensation prediction system according to claim 1, which further comprises:
opposite parity field motion estimation means connected in parallel to said same parity, near field, and inter-field interpolated motion estimation means for performing motion estimation from odd field input data with respect to even field reference data and even field input data with respect to odd field reference data by using the same vectors for odd and even fields of the input picture.

9. The interlaced video signal motion compensation prediction system according to claim 8, which comprises:
further means in said opposite parity field motion estimation means for producing an interpolated pel block of fractional pel accuracy with respect to a reference picture block;
thereby improving the accuracy of motion estimation.

10. The interlaced video signal motion compensation prediction system according to claim 9, wherein:
motion estimation is performed in a first state of executing motion estimation of integer pel accuracy with respect to a reference picture block to obtain a motion vector, and is performed in a second stage of executing motion estimation by using interpolation pel or pels of fractional pel accuracy near the start position of the motion vector obtained in said first stage, thereby permitting reduction of the processing time of motion estimation.

11. The interlaced video signal motion compensation prediction system according to claim 1, which further comprises:
far field motion estimation means for performing motion estimation for each block from odd and even field input data with respect to temporally far field reference data by using the same vectors for odd and even fields of the input picture.

12. The interlaced video signal motion compensation prediction system according to claim 11, which comprises:
further means in said far field motion estimation means for producing an interpolated pel block of fractional pel accuracy with respect to a reference picture block;
thereby improving the accuracy of motion estimation.

13. The interlaced video signal motion compensation prediction system according to claim 12, wherein:
motion estimation is performed ill a first state of executing motion estimation of integer pel accuracy with respect to a reference picture block to obtain a motion vector, and is performed in a second stage of executing motion estimation by using interpolation pel or pels of fractional pel accuracy near the start position of the motion vector obtained in said first stage, thereby permitting reduction of the processing time of motion estimation.

14. The interlaced video signal motion compensation prediction system according to claim 1, which comprises:
further means in at least one of said motion estimation means for producing an interpolated pel block of fractional pel accuracy with respect to a reference picture block;
thereby improving the accuracy of all of said motion estimations.

15. The interlaced video signal motion compensation prediction system according to claim 14, wherein:
motion estimation is performed in a first state of executing motion estimation of integer pel accuracy with respect to a reference picture block to obtain a motion vector, and in a second stage of executing motion estimation by using interpolation pel or pels of fractional pel accuracy near the start position of the motion vector obtained in said first stage, thereby permitting reduction of the processing time of all of said motion estimations.

16. An interlaced video signal motion compensation prediction system for performing block-by-block motion vector prediction by using input and reference pictures and also motion compensation with error of said prediction comprising:
a plurality of motion estimation means for performing motion estimation of each block with respect to one or more of said reference pictures by providing motion vectors;
processing means for adding predetermined constants to a prediction error signal obtained from each said motion estimation means according to the number of motion vectors;
means for comparing each prediction error output from said processing means and selecting a selection flag indicative of the smallest prediction error and a motion vector from the motion estimation means providing said smallest prediction error; and
means for transmitting said selection flag and a motion vector corresponding to said selection flag.

17. The interlaced video signal motion compensation prediction system according to claim 16, including means responsive to a prediction error value smaller than a predetermined threshold value for preferentially selecting a system of motion compensation with a single motion vector.

18. The interlaced error value motion compensation prediction system according to claim 16, including preferentially selecting smaller numbers of motion vectors if the differences between prediction errors in each motion compensation is less than a predetermined threshold value.

19. The interlaced video signal motion compensation prediction system according to claim 16, wherein:
said predetermined constants are determined according to coded information including the number of motion vectors, accumulated bit count, quantization scale, and video coding modes.

* * * * *